US009112237B2

United States Patent
Kim

(10) Patent No.: US 9,112,237 B2
(45) Date of Patent: Aug. 18, 2015

(54) ELECTROLYTE FOR RECHARGEABLE LITHIUM BATTERY AND RECHARGEABLE LITHIUM BATTERY INCLUDING SAME

(75) Inventor: Seung-Mo Kim, Yongin-si (KR)

(73) Assignees: Samsung SDI Co., Ltd., Giheung-gu, Yongin-si, Gyeonggi-do (KR); ROBERT BOSCH GMBH, Stuttgart (DE)

(*) Notice: Subject to any disclaimer, the term of this patent is extended or adjusted under 35 U.S.C. 154(b) by 681 days.

(21) Appl. No.: 13/416,195

(22) Filed: Mar. 9, 2012

(65) Prior Publication Data

US 2012/0258357 A1 Oct. 11, 2012

(30) Foreign Application Priority Data

Apr. 11, 2011 (KR) .................... 10-2011-0033394

(51) Int. Cl.
| | | |
|---|---|---|
| *H01M 10/052* | (2010.01) | |
| *H01M 6/16* | (2006.01) | |
| *H01M 10/0568* | (2010.01) | |

(52) U.S. Cl.
CPC ............ *H01M 10/052* (2013.01); *H01M 6/166* (2013.01); *H01M 10/0568* (2013.01); *H01M 2300/0025* (2013.01); *Y02E 60/122* (2013.01); *Y02T 10/7011* (2013.01)

(58) Field of Classification Search
CPC .......... H01M 10/052; H01M 10/0568; H01M 6/166; H01M 2300/0025; Y02E 60/122; Y02T 10/7011
USPC .............................. 429/231.95, 324; 252/62.2
See application file for complete search history.

(56) References Cited

U.S. PATENT DOCUMENTS

| | | | |
|---|---|---|---|
| 2004/0106047 A1* | 6/2004 | Mie et al. ........................ 429/324 |
| 2010/0159334 A1 | 6/2010 | Kashima et al. | |

(Continued)

FOREIGN PATENT DOCUMENTS

| | | |
|---|---|---|
| JP | 2008257963 | 10/2008 |
| JP | 2009-129797 | † 6/2009 |

(Continued)

OTHER PUBLICATIONS

Abouimrane et al., Liquid electrolyte based on lithium bisfluorosulfonyl imide salt: Aluminum corrosion studies and ion on battery investigations, J. Power Sources (2009) 189, pp. 693-696.

(Continued)

*Primary Examiner* — Laura Weiner
(74) *Attorney, Agent, or Firm* — Robert E. Bushnell, Esq.

(57) ABSTRACT

Disclosed is an electrolyte for a rechargeable lithium battery and a rechargeable lithium battery including the same, and the electrolyte includes a lithium salt composition including a first lithium salt; and a second lithium salt of lithium bisfluorosulfonyl imide represented by the following Chemical Formula 1 at a mole ratio of 1:0.05 to 1:1, and a non-aqueous organic solvent.

Chemical Formula 1

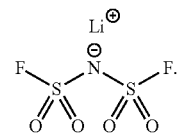

12 Claims, 3 Drawing Sheets

(56) References Cited

U.S. PATENT DOCUMENTS

2010/0178555 A1    7/2010    Best
2011/0081583 A1    4/2011    Sugimoto et al.
2011/0151317 A1    6/2011    Giroud et al.

FOREIGN PATENT DOCUMENTS

KR    10-2007-0020809    *    2/2007
KR    1020070020809      2/2007
KR    1020100007974      1/2010
KR    1020100038400      4/2010
WO    9940025    8/1999

OTHER PUBLICATIONS

Ishikawa et al., Pure ionic electrolytes compatible with a graphitized carbon negative electrode in rechargeable lithium-ion batteries, J. Power Sources (2006) 162, pp. 658-662.

Korean Office action issued by KIPO on Jul. 24, 2012 in connection with Korean Application No. 10-2011-0033394 and Request for Entry attached herewith.

* cited by examiner
† cited by third party

ELECTROLYTE FOR RECHARGEABLE LITHIUM BATTERY AND RECHARGEABLE LITHIUM BATTERY INCLUDING SAME

CLAIM OF PRIORITY

This application claims priority to and the benefit of Korean Patent Application No. 10-2011-0033394 filed in the Korean Intellectual Property Office on Apr. 11, 2011, the entire contents of which are incorporated herein by reference.

BACKGROUND OF THE INVENTION

1. Field of the Invention

This disclosure relates to an electrolyte for a rechargeable lithium battery and a rechargeable lithium battery including the same.

2. Description of the Related Art

Recently, rechargeable lithium batteries are increasing in size from small rechargeable batteries for laptops and mobile phones to large rechargeable batteries for electric vehicles (EV) and hybrid electric vehicles (HEV). Since the batteries used for the electric vehicles (EV) are used outdoors, they should not be sensitive to temperature change. Particularly, when the batteries are used in a region of high latitude where the temperature is low, the output at a low temperature is important. The output at low temperature usually depends on the physical properties of an electrolyte. When the temperature drops close to the freezing point of a solvent of the electrolyte, the viscosity of the solvent rises drastically, thus remarkably decreasing the mobility of lithium ions.

This situation may be improved by changing the form of the solid electrolyte interface (SEI) formed on the surface of the negative electrode during the initial formation of the battery or by changing the form of the anions of the lithium salt.

The basic composition of a rechargeable lithium battery includes a positive electrode, a negative electrode, and an electrolyte. For positive active materials, lithium-transition element composite oxides capable of intercalating lithium ions such as $LiCoO_2$, $LiMn_2O_4$, $LiNi_{1-x}Co_xO_2$ ($0<x<1$), and the like are being used. For negative active materials, various carbon-based materials which may intercalate/deintercalate lithium ions are being used. For an electrolyte, a lithium salt dissolved in a non-aqueous organic solvent has been used.

SUMMARY OF THE INVENTION

One embodiment of the present invention provides an electrolyte for a rechargeable lithium battery having improved low temperature output and high temperature characteristics.

Another embodiment of the present invention provides a rechargeable lithium battery including the electrolyte.

According to one embodiment of the present invention, an electrolyte for a rechargeable lithium battery is provided that includes a lithium salt composition including a first lithium salt and a second lithium salt of lithium bisfluorosulfonyl imide (LiFSI) represented by the following Chemical Formula 1 at a mole ratio of 1:0.05 to 1:1, and a non-aqueous organic solvent.

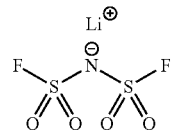

Chemical Formula 1

The first lithium salt and the second lithium salt may also be present at a mole ratio of about 1:0.25 to about 1:0.43.

In an electrolyte according to one embodiment of the present invention, the second lithium salt may be present at about 0.05M to 0.5M. The first lithium salt may be present at about 0.5 M to about 1.3M.

The first lithium salt may include $LiPF_6$, $LiBF_4$, $LiSbF_6$, $LiAsF_6$, $LiClO_4$, $LiAlO_4$, $LiAlCl_4$, $LiSO_3CF_3$, or combinations thereof, and particularly $LiPF_6$.

According to another embodiment of the present invention, a rechargeable lithium battery is provided that includes the electrolyte, a positive electrode including a positive active material, and a negative electrode including the negative active material.

Hereinafter, further embodiments of the present invention will be described in detail.

The electrolyte for a rechargeable lithium battery according to one embodiment has improved low temperature output and high temperature characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
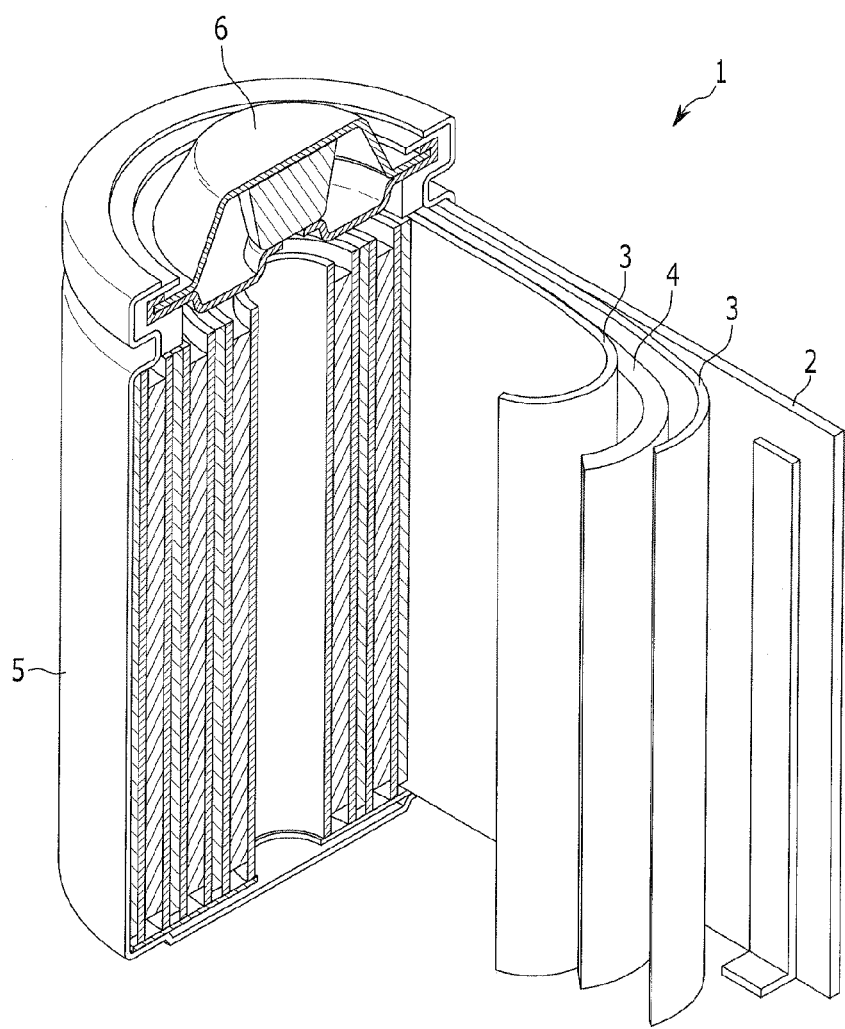
FIG. 1 shows a structure of a rechargeable lithium battery according to one embodiment of the present invention.

Exemplary embodiments of the present invention will hereinafter be described in detail. However, these embodiments are only exemplary, and the present invention is not limited thereto.

An electrolyte for a rechargeable lithium battery according to one embodiment of the present invention includes a lithium salt including a first lithium salt and a second lithium salt of lithium bisfluorosulfonyl imide represented by the following Chemical Formula 1, and a non-aqueous organic solvent.

Chemical Formula 1

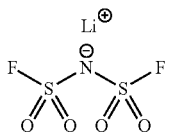

The first lithium salt and the second lithium salt may be present at a mole ratio of about 1:0.05 to about 1:1, or about 1:0.25 to about 1:0.43. When the mole ratio of the first lithium salt and the second lithium salt goes out of this range, that is, when the mole ratio of the second lithium salt exceeds the range, the current collector of the positive electrode may corrode.

Also, since the lithium bisfluorosulfonyl imide, which is the second lithium salt, has low viscosity at low temperature, for example, about 35 mPa·s at −20° C., the electrolyte including the lithium bisfluorosulfonyl imide has a small increase in the viscosity of the organic solvent at low temperature, the mobility of the resultant lithium ions may be maintained, and thus low temperature output may be improved remarkably. However, when the lithium bisfluorosulfonyl imide is alone used as a lithium salt of the electrolyte (See *Journal of Power Sources* 189 (2009) 639-696), the current collector of the positive electrode, which is formed of Al, may corrode, which is not desirable.

In an electrolyte according to one embodiment of the present invention, the amount of the second lithium salt may range from about 0.05M to about 0.5M. In other words, the second lithium salt may exist in the electrolyte solution in a concentration of about 0.05M to about 0.5M. When the amount of the second lithium salt falls in this range, the ion conductivity at room temperature and low temperature is higher than the ion conductivity when the first lithium salt is used alone.

The first lithium salt may be present at about 0.5M to about 1.3M. When the amount of the first lithium salt falls in this range, excellent output characteristics may be realized.

The first lithium salt may include $LiPF_6$, $LiBF_4$, $LiSbF_6$, $LiAsF_6$, $LiClO_4$, $LiAlO_4$, $LiAlCl_4$, or combinations thereof, and particularly $LiPF_6$, which may improve low temperature output characteristics.

Also, in an electrolyte according to one embodiment of the present invention, the entire lithium salt composition including the first lithium salt and the second lithium salt at a low temperature (about −20° C.) may have an ion conductivity of 1.7 mS/cm or higher and a viscosity of about 60 mPas or less, which improves the low temperature output.

The organic solvent serves as a medium through which ions involved in the electrochemical reaction of a battery may transfer.

The organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone, and the like. Examples of the alcohol-based solvent include ethyl alcohol, isopropyl alcohol, and the like, and examples of the aprotic solvent include nitriles such as R—CN (wherein R is a C2 to C20 linear, branched, or cyclic hydrocarbon group including a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and the linear carbonate are mixed together in the volume ratio of about 1:1 to about 1:9, and when the mixture is used as an electrolyte, the electrolyte performance may be enhanced.

The electrolyte may further include an additive for forming a Solid Electrolyte Interface (SEI), which is generally known to those skilled in the art. For example, the electrolyte may further include a cycle-life improving additive, such as vinylene carbonate, vinyl ethylene carbonate, 1,3-propenesultone, 1,3-propanesultone, succinyl anhydride, lactams, and caprolactams, to improve cycle-life. Also, the electrolyte may further include cyclic hexyl benzene, biphenyl, parachlorobenzene and the like to improve overcharge. The additive is not limited to the above-mentioned examples, and diverse kinds of negative electrodes and positive electrode SEI forming additives may be added to improve the performance of a battery.

According to another embodiment of the present invention, a rechargeable lithium battery including the electrolyte is provided. The rechargeable lithium battery includes a positive electrode and a negative electrode.

The negative electrode includes a current collector and a negative active material layer formed on the current collector. The negative active material layer includes a negative active material.

The negative active material includes a material that reversibly intercalates/deintercalates lithium ions, a lithium metal, a lithium metal alloy, a material being capable of doping/de-doping lithium, or a transition metal oxide.

The material that reversibly intercalate/deintercalates lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and the like.

A silicon-based material may be also used in a negative electrode, and the silicon-based material may be used singularly or as a mixture of carbon and silicon. The silicon-based material may include Si, $SiO_x$ (0<x<2), a Si-Q alloy (wherein Q is an element selected from the group consisting of an alkali metal, an alkali-earth metal, a group 13 element, a group 14 element, a group 15 element, a group 16 element, a transition element, a rare earth element, and a combination thereof, and is not Si), Sn, $SnO_2$, a Sn—R alloy (wherein R is an element selected from the group consisting of an alkali metal, an alkali-earth metal, a group 13 element, a group 14 element, a group 15 element, a group 16 element, a transition element, a rare earth element, and a combination thereof, and is not Sn), or mixtures thereof. At least one of these materials may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

In the negative active material layer, the negative active material may be included in an amount of about 95 wt % to about 99 wt % based on the total weight of the negative active material layer.

The negative active material layer includes a binder, and optionally a conductive material. The negative active material layer may include about 1 wt % to about 5 wt % of a binder based on the total weight of the negative active material layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves properties for binding active material particles with one another and with a current collector. The binder may include a non-water-soluble binder, a water-soluble binder, or combinations thereof.

Examples of the non-water-soluble binder include polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth) acrylic acid and (meth)acrylic acid alkyl ester, or combinations thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be sodium (Na), potassium (K), or lithium (Li). The cellulose-based compound may be included in an amount of about 0.1 to 3 parts by weight based on 100 parts by weight of the negative active material.

The conductive material is included to improve electrode conductivity. It may include any electrically conductive material, unless it causes a chemical change. Examples of the conductive material include carbon-based materials such as natural graphite, artificial graphite, carbon black, acetylene black, ketjen black, carbon fiber, and the like; metal-based materials such as a metal powder, a metal fiber, or the like including copper, nickel, aluminum, silver, and the like; a conductive polymer such as a polyphenylene derivative; or mixtures thereof.

The current collector may be selected from the group consisting of a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector. The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used. The positive active material may be the following lithium-containing compounds: $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX^cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $LiaNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFe_{1-g}G_gPO_4$ ($0.90 \leq a \leq 1.8$, $0 \leq g \leq 0.5$).

In the above formulas, A is selected from Ni, Co, Mn, and combinations thereof; X is selected from Al, Ni, Co, Mn, Cr, Fe, Mg, Sr, V, a rare earth element, and combinations thereof; D is selected from O, F, S, P, and combinations thereof; E is selected from Co, Mn and combinations thereof; T is selected from F, S, P, and combinations thereof; G is selected from Al, Cr, Mn, Fe, Mg, La, Ce, Sr, V. and combinations thereof; Q is selected from Ti, Mo, Mn, and combinations thereof; Z is selected from Cr, V, Fe, Sc, Y, and combinations thereof; and J is selected from V. Cr, Mn, Co, Ni, Cu, and combinations thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or mixtures thereof. The coating layer may be formed in a method having no adverse influence on properties of a positive active material by including these elements in the compound. For example, the method may include any coating method such as spray coating, dipping, and the like, but is not illustrated in more detail, since it is well-known to those who work in the related field.

In the positive active material layer, the positive active material is included in an amount of about 90 wt % to about 98 wt % based on the total weight of the positive active material layer.

The positive active material layer includes a binder and a conductive material. The positive active material layer may include about 1 wt % to about 5 wt % of a binder and a conductive material based on the total weight of the positive active material layer, respectively.

The binder improves binding properties of the positive active material particles to one another, and also with a current collector. Examples of the binder include at least one of polyvinylalcohol, carboxyl methylcellulose, hydroxypropylcellulose, diacetylcellulose, polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as polyphenylene derivative, and the like; or mixtures thereof.

The current collector may be an Al foil, but is not limited thereto.

The negative and positive electrodes may be fabricated by a method including mixing the active material, a conductive material, and a binder into an active material composition and coating the composition on a current collector. The electrode manufacturing method is well known, and thus is not described in detail in the present specification. The solvent may be N-methylpyrrolidone but it is not limited thereto. When a water-soluble binder is used in a negative electrode, water may be used as a solvent during preparation of a negative active material composition.

The rechargeable lithium battery may further include a separator between a negative electrode and a positive electrode, as needed. Examples of suitable separator materials include polyethylene, polypropylene, polyvinylidene fluoride, and multi-layers thereof. Examples of the multi-layered separator include a polyethylene/polypropylene double-layered separator, a polyethylene/polypropylene/polyethylene triple-layered separator, and a polypropylene/polyethylene/polypropylene triple-layered separator. The separator may further include a ceramic layer on its surface. The ceramic layer generally includes an aluminum oxide, but the scope of the present invention is not limited thereto. The thickness of the ceramic layer may be around 6 μm.

Rechargeable lithium batteries may be classified into lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabrication methods for lithium ion batteries are well known in the art.

FIG. 1 is a schematic view showing a representative structure of a rechargeable lithium battery according to one embodiment. As shown in FIG. 1, the rechargeable lithium battery 1 includes a battery case 5 including a positive electrode 3, a negative electrode 2, and a separator 4 interposed between the positive electrode 3 and the negative electrode 2, an electrolyte impregnated therein, and a sealing member 6 sealing the battery case 5.

Hereinafter, embodiments are illustrated in more detail with reference to examples. However, the following are exemplary embodiments and are not limiting.

Comparative Example 1

A negative active material slurry was prepared by mixing a modified natural graphite negative active material, a styrene butadiene rubber binder, and a carboxylmethyl cellulose thickener in water at a weight ratio of 98:1:1. A negative electrode was fabricated through a typical process of coating a Cu-foil current collector with the negative active material slurry, drying the coated current collector, and compressing it.

A positive active material slurry was prepared by mixing a positive active material including a mixture of $LiNi_{0.8}Co_{0.15}Al_{0.05}O_2$ and $LiNi_{0.5}Co_{0.2}Mn_{0.3}O_2$, a carbon black conductive material, and a polyvinylidene fluoride binder in an N-methyl pyrrolidone solvent at a weight ratio of 92:4:4. A positive electrode was fabricated through a typical process of coating an Al-foil current collector with the positive active material slurry, drying the coated current collector, and compressing it.

A rechargeable lithium battery cell of 18650 size was manufactured through a typical process by using the negative electrode, the positive electrode and an electrolyte. As for the electrolyte, a mixed solvent of ethylene carbonate, methyl propionate, and ethyl propionate (2:4:4 volume ratio) including 1M $LiPF_6$ dissolved therein was used.

Example 1

A rechargeable lithium battery cell was manufactured according to the same method as Comparative Example 1, except that a mixed solvent of ethylene carbonate, methyl propionate, and ethyl propionate (2:4:4 volume ratio) including 1M $LiPF_6$ and 0.053M lithium bisfluorosulfonyl imide (LiFSI) dissolved therein was used as an electrolyte.

Example 2

A rechargeable lithium battery cell was manufactured according to the same method as Comparative Example 1, except that a mixed solvent of ethylene carbonate, methyl propionate, and ethyl propionate (2:4:4 volume ratio) including 0.7M $LiPF_6$ and 0.3M lithium bisfluorosulfonyl imide (LiFSI) dissolved therein was used as an electrolyte.

Example 3

A rechargeable lithium battery cell was manufactured according to the same method as Comparative Example 1, except that a mixed solvent of ethylene carbonate, methyl propionate, and ethyl propionate (2:4:4 volume ratio) including 0.5M $LiPF_6$ and 0.5M lithium bisfluorosulfonyl imide (LiFSI) dissolved therein was used as an electrolyte.

Example 4

A rechargeable lithium battery cell was manufactured according to the same method as Comparative Example 1, except that a mixed solvent of ethylene carbonate, methyl propionate, and ethyl propionate solvent (2:4:4 volume ratio) including 0.3M $LiPF_6$ and 0.7M lithium bisfluorosulfonyl imide (LiFSI) dissolved therein was used as an electrolyte.

Measurement of viscosity and ion conductivity of a lithium salt Electrolytes were prepared by, respectively, adding 1M $LiPF_6$, 1M lithium bisfluorosulfonyl imide (LiFSI) and 1M lithium bis(trifluoromethane sulfone)imide (LiTFSI) to a mixed solvent of ethylene carbonate and ethylmethyl carbonate (1:1 volume ratio). The viscosity and ion conductivity of the electrolytes were measured at 25° C., 0° C., −20° C., and the measurement results are shown in the following Table 1.

TABLE 1

| Temperature | Ion conductivity (mS/cm) | | | Viscosity (mPas) | | |
| --- | --- | --- | --- | --- | --- | --- |
| (° C.) | LiPF$_6$ | LiFSI | LiTFSI | LiPF$_6$ | LiFSI | LiTFSI |
| 25 | 8.1 | 8.8 | 6.3 | 7.5 | 6.3 | 8.1 |
| 0 | 4.1 | 4.9 | 3.3 | 21 | 13 | 20 |
| −20 | 1.7 | 2.7 | 1.4 | 60 | 35 | 54 |

It may be seen from Table 1 that the viscosities of LiFSI and LiPF$_6$ were similar at room temperature, which was 25° C., but as the temperature went down, the increase in the viscosity of LiFSI was not greater than that of LiPF$_6$. In consequence, since the viscosity of LiFSI at low temperature (−25° C.) was lower than the viscosity of LiPF$_6$, when LiFSI was used for an electrolyte, ion mobility increased at low temperature, which may be also understood as the ion conductivity improving. Since the improvement in the ion conductivity decreases cell internal resistance, an output improvement effect may be expected.

Also, LiTFSI showed a little higher viscosity than that of LiFSI at room temperature of 25° C., but the viscosity drastically increased to much higher than that of LiFSI at low temperature of −20° C. As a result, it may be seen that the effect of increasing ion mobility at a low temperature is not much better when LiTFSI is used for an electrolyte than when LiFSI is used.

Example 5

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 0.5M LiPF$_6$ and 0.5M lithium bisfluorosulfonyl imide (LiFSI) dissolved therein was used as an electrolyte.

Example 6

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 0.7M LiPF$_6$ and 0.3M lithium bisfluorosulfonyl imide (LiFSI) dissolved therein was used as an electrolyte.

Comparative Example 2

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 1.0M LiPF$_6$ dissolved therein was used as an electrolyte.

Comparative Example 3

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 1.0M lithium bisfluorosulfonyl imide (LiFSI) dissolved therein was used as an electrolyte.

Comparative Example 4

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 0.5M LiPF$_6$ and 0.5M lithium bis(trifluoromethanesulfone)imide (LiTFSI) dissolved therein was used as an electrolyte.

Comparative Example 5

A rechargeable lithium battery cell was manufactured according to the same method as Comparative Example 1, except that a mixed solvent of ethylene carbonate, ethylmethyl carbonate, and dimethylcarbonate solvent (2:4:4 volume ratio) including 0.7M LiPF$_6$ and 0.3M lithium bis(trifluoromethanesulfone)imide (LiTFSI) dissolved therein was used as an electrolyte.

Comparative Example 6

A rechargeable lithium battery cell was manufactured according to the same method as Comparative Example 1, except that a mixed solvent of ethylene carbonate, ethylmethyl carbonate, and dimethylcarbonate (2:4:4 volume ratio) including 0.5M lithium bisfluorosulfonyl imide (LiFSI) dissolved therein was used as an electrolyte.

Measurement of Viscosity and Ion Conductivity of a Lithium Salt

Ion conductivities of the electrolytes prepared according to Examples 5 and 6 and Comparative Examples 2 to 5 were measured at 25° C., and the measurement results are shown in the following Table 2.

TABLE 2

| | LiPF$_6$ (M) | LiTFSI (M) | LiFSI (M) | Ion conductivity (mS/cm) |
| --- | --- | --- | --- | --- |
| Comparative Example 2 | 1 | 0 | 0 | 10.11 |
| Comparative Example 3 | 0 | 1 | 0 | 8.41 |
| Comparative Example 4 | 0.5 | 0 | 0 | 9.42 |
| Comparative Example 5 | 0.7 | 0.3 | 0 | 9.92 |
| Comparative Example 6 | 0 | 0 | 1 | 12.12 |
| Example 5 | 0.5 | 0 | 0.5 | 11.23 |
| Example 6 | 0.7 | 0 | 0.3 | 10.85 |

As shown in Table 2, the ion conductivities at room temperature of 25° C. were in the order of LiFSI>LiPF$_6$>LiTFSI, and thus the ion conductivities of the electrolytes of Examples 5 and 6 using a mixture of LiFSI and LiPF$_6$ were higher than the ion conductivities of the electrolytes of Comparative Examples 4 to 5 using a mixture of LiTFSI and LiPF$_6$.

It may be expected from the results of Tables 1 and 2 that when LiFSI is used for an electrolyte along with LiPF$_6$, the ion conductivity at low temperature and room temperature is improved.

Evaluation of Battery Cell Characteristics

The rechargeable lithium battery cells manufactured according to Examples 1 to 4 and Comparative Example 1 went through a formation process. The formation process was performed by charging the battery cells with a constant current at 0.2 C up to 3.6V, discharging them to 2.8V (first cycle), charging them with a constant current at 0.2 C up to 4.2V, discharging them to 2.8V (second cycle), and charging them with a constant current and constant voltage at 0.2 C up to 3.7V (third cycle). After the formation process was completed, the rechargeable lithium battery cells were aged for one day at a room temperature of 25° C. and one day at a high temperature of 60° C. After the aging, the initial capacity of the rechargeable lithium battery cells and the DC internal resistance at the room temperature of 25° C. were measured, and for some of the rechargeable lithium battery cells, the DC internal resistance (DC-IR) at room temperature 25° C. and a low temperature of −30° C. were measured.

Subsequently, the rechargeable lithium battery cells whose DC internal resistance at low temperature was measured were charged to SOC 80% and stored in a high-temperature chamber set to 60° C., and their capacities after being allowed to stand at the high temperature for 10 days, 20 days, and 30 days were measured. Herein, the charging and the allowing them to stand at the high temperature were performed after waiting until the temperatures of the rechargeable lithium battery cells come to room temperature after the low temperature DC internal resistance was measured. Herein, the SOC80% condition means a state in which 80% of a charge capacity is charged when the entire charge capacity of a battery cell is regarded as 100%. The capacity retention after being allowed to stand at high temperature for 30 days was obtained as a percentage of the discharge capacity after being allowed to stand at 60° C. for 30 days of the initial discharge capacity.

The initial capacity and the capacity after being allowed to stand at a high temperature of 60° C. were obtained by performing CC-CV (constant current-constant voltage) charging onto the battery cells with a current of 0.5 C to 4.2V and then performing a cut-off discharging onto the battery cells with a current of 0.2 C to 2.8V, and measuring the discharge capacity.

Direct current internal resistance (DC-IR) at a low temperature of −30° C. was measured by measuring the initial capacities of the battery cells, charging the battery cells at 0.2 C up to SOC 50%, applying 10 different discharge current levels, which were 0.6 A, 1 A, 1.4 A, 1.6 A, 1.8 A, 2 A, 2.2 A, 2.4 A, 2.6 A and 2.8 A, to the battery cells for 10 seconds, and then measuring the voltages after the application of the 10 different discharge current levels. From the current-voltage values, the current values (Imax) at 2.1V were obtained, and then DC-IR values were obtained based on the following Equation 1. Herein, the SOC50% condition means a state in which 50% of a charge capacity is charged when the entire charge capacity of a battery cell is regarded as 100%.

$$DC\text{-}IR = (V0 - 2.1V)/I_{max} \quad \text{Equation 1}$$

(In Equation 1, V0=Initial voltage at 50% of SOC)

Room-temperature resistance was obtained based on R=V/I by discharging a battery cell with a current of 1 A for 10 seconds and then measuring the voltage over time.

Also, the 18650 battery cells whose initial capacity and room temperature DC resistance were measured were charged and discharged at 25° C. with a current of 7 C for 300 times, and then their capacity retentions were measured and are shown in the following Table 3. The capacity retention is a discharge capacity % after charge and discharge were performed 300 times with the current of 7 C based on the discharge capacity after the formation process was performed.

The results of DC internal resistance and cycle-life characteristics are presented in the following Table 3. Also, the DC internal resistance measurement results of the battery cells according to Comparative Example 1 and Examples 2 to 4 at a room temperature and low temperature are shown in FIG. 2, and the results of allowing the battery cells to stand at a high temperature and the cycle-life characteristics of the battery cells are shown in FIG. 3.

TABLE 3

|  | Lithium salt | Organic solvent (volume ratio) | 25° C. DC-IR (mΩ) | −30° C. DC-IR (mΩ) | Cycle-life (%) Capacity retention after being allowed to stand at high temperature for 30 days (%) | Capacity retention at 300th cycle (%) |
|---|---|---|---|---|---|---|
| Comparative Example 1 | LiPF$_6$ | EC/MP/EP (2/4/4) | 76.4 | 380 | 71 | 69 |
| Example 1 | LiPF$_6$/LiFSI (1M/0.053M) | EC/MP/EP (2/4/4) | 76.2 | 355 | 77 | 75 |
| Example 2 | LiPF$_6$/LiFSI (0.7M/0.3M) | EC/MP/EP (2/4/4) | 75.2 | 335 | 80 | 83 |
| Example 3 | LiPF$_6$/LiFSI (0.5M/0.5M) | EC/MP/EP (2/4/4) | 73.3 | 325 | 82 | 84 |
| Example 4 | LiPF$_6$/LiFSI (0.3M/0.7M) | EC/MP/EP (2/4/4) | 73.5 | 320 | 82 | 86 |

Figure 2:
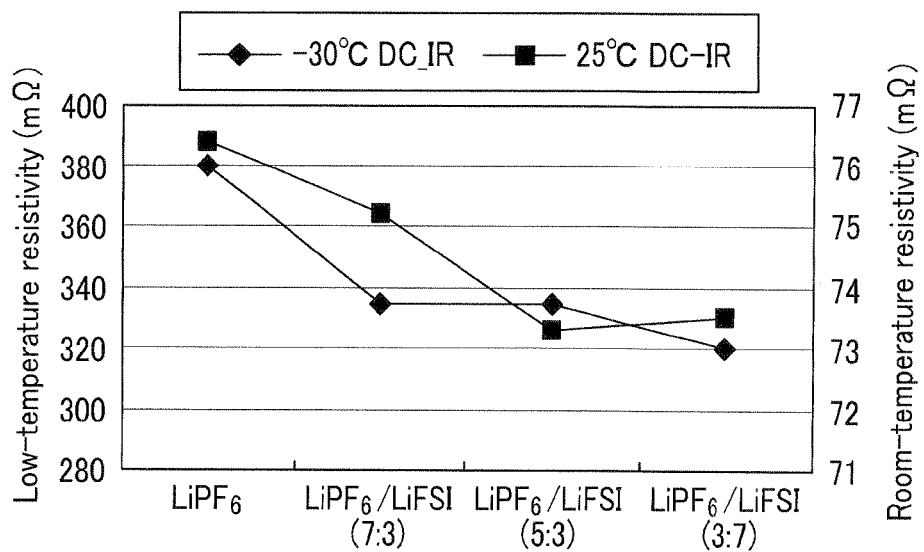
FIG. 2 is a graph showing direct-current (DC) internal resistances of rechargeable lithium batteries using the electrolyte solutions of Examples 2 to 4 and Comparative Example 1 measured at a room temperature and high temperature.
Figure 3:
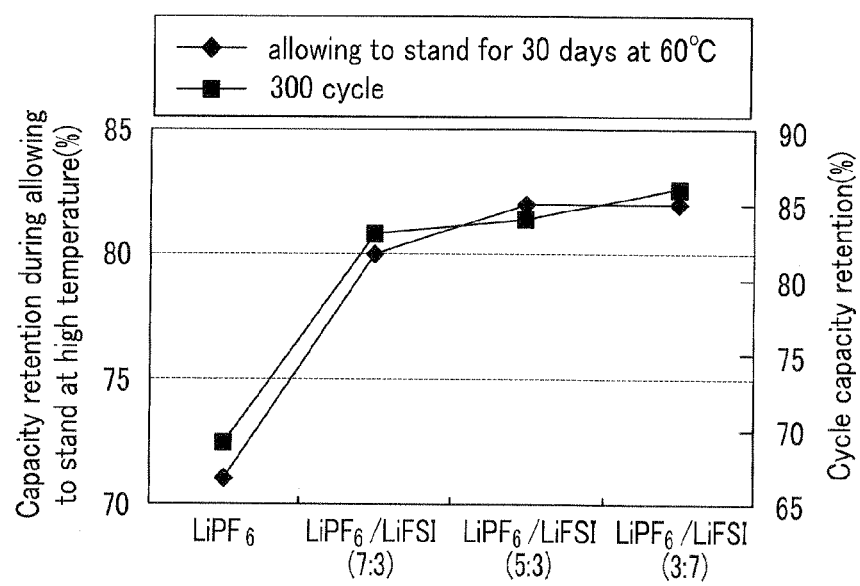
FIG. 3 is a graph showing the characteristics of a composition allowing stand at high temperature, and the cycle-life characteristics of a rechargeable lithium batteries using the electrolyte solutions of Examples 2 to 4 and Comparative Example 1.

As shown in Table 3 and FIG. 2, the rechargeable lithium battery cells using the electrolyte solutions of Examples 1 to 4 had lower DC internal resistance at room temperature and high temperature than the rechargeable lithium battery cell of Comparative Example 1. Particularly, it may be seen that as the amount of LiFSI increases, the DC internal resistance decreases.

The results from Table 1 show that LiFSI has less of a decrease in the ion conductivity and a smaller increase in viscosity than LiPF$_6$ at low temperature.

Also, as shown in Table 3, the rechargeable lithium battery cell using the electrolytes of Examples 1 to 4 had more excellent cycle-life characteristics compared to that of Comparative Example 1. Particularly, the rechargeable lithium battery cells using the electrolytes of Examples 1 to 4 had superior capacity retention after being allowed to stand at high temperature compared to that of Comparative Example 1. This is because the thermal stability of LiFSI is better than the thermal stability of LiPF$_6$ (the thermal decomposition temperatures of LiFSI and LiPF$_6$ when 2% weight decrease was attained in a TGA analysis turned out to be 185° C. and 154° C., respectively). Also, since LiFSI produces little generation of HF caused by moisture, it is understood that a result favorable for cycle-life is exhibited, compared to LiPF$_6$.

While this disclosure has been described in connection with what is presently considered to be practical exemplary embodiments, it is to be understood that this disclosure is not limited to the disclosed embodiments, but, on the contrary, is intended to cover various modifications and equivalent arrangements included within the spirit and scope of the appended claims. Therefore, the above-mentioned embodiments are exemplary but do not limit in any sense.

What is claimed is:

1. An electrolyte for a rechargeable lithium battery, comprising:
a lithium salt composition including:
a first lithium salt;
a second lithium salt of lithium bisfluorosulfonyl imide represented by the following Chemical Formula 1;
the first lithium salt to second lithium salt mole ratio is between about 1:0.05 to about 1:1; and
a non-aqueous organic solvent;

Chemical Formula 1

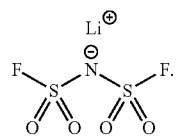

2. The electrolyte for a rechargeable lithium battery of claim 1, wherein the first lithium salt to second lithium salt mole ratio is between about 1:0.25 to about 1:0.43.

3. The electrolyte for a rechargeable lithium battery of claim 1, wherein the second lithium salt is present at about 0.05M to about 0.5M.

4. The electrolyte for a rechargeable lithium battery of claim 1, wherein the first lithium salt is present at about 0.5M to about 1.3M.

5. The electrolyte for a rechargeable lithium battery of claim 1, wherein the first lithium salt comprises $LiPF_6$, $LiBF_4$, $LiSbF_6$, $LiAsF_6$, $LiClO_4$, $LiAlO_4$, $LiAlCl_4$, $LiSO_3CF_3$, or combinations thereof.

6. The electrolyte for a rechargeable lithium battery of claim 1, wherein the first lithium salt comprises $LiPF_6$.

7. A rechargeable lithium battery comprising:
an electrolyte comprising a lithium salt composition including:
a first lithium salt;
a second lithium salt of lithium bisfluorosulfonyl imide represented by the following Chemical Formula 1;
the first lithium salt to second lithium salt mole ratio is between about 1:0.05 to about 1:1; and
a non-aqueous organic solvent;
a positive electrode including a positive active material; and
a negative electrode including a negative active material;

Chemical Formula 1

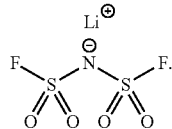

8. The rechargeable lithium battery of claim 7, wherein the first lithium salt to second lithium salt mole ratio is between about 1:0.25 to about 1:0.43.

9. The rechargeable lithium battery of claim 7, wherein the second lithium salt is present at about 0.05M to about 0.5M.

10. The rechargeable lithium battery of claim 7, wherein the first lithium salt is present at about 0.5M to about 1.3M.

11. The rechargeable lithium battery of claim 7, wherein the first lithium salt comprises $LiPF_6$, $LiBF_4$, $LiSbF_6$, $LiAsF_6$, $LiClO_4$, $LiAlO_4$, $LiAlCl_4$, $LiSO_3CF_3$, or combinations thereof.

12. The rechargeable lithium battery of claim 7, wherein the first lithium salt comprises $LiPF_6$.

* * * * *